United States Patent [19]

Stehlin et al.

[11] Patent Number: 5,670,082
[45] Date of Patent: Sep. 23, 1997

[54] BLEACHING AUXILIARY

[75] Inventors: Albert Stehlin, Rosenau, France; Klaus Huber, Freiburg; Thomas Maier, Schliengen, both of Germany

[73] Assignee: Ciba-Geigy Corporation, Tarrytown, N.Y.

[21] Appl. No.: 352,998

[22] Filed: Dec. 9, 1994

Related U.S. Application Data

[63] Continuation-in-part of Ser. No. 255,495, Jun. 8, 1994, abandoned.

[30] Foreign Application Priority Data

Jun. 11, 1993 [CH] Switzerland .......... 1744/93

[51] Int. Cl.$^6$ .......................................... C01B 15/00
[52] U.S. Cl. .......................................... 252/186.42
[58] Field of Search .......................................... 252/186.42

[56] References Cited

U.S. PATENT DOCUMENTS

| | | | |
|---|---|---|---|
| 2,927,082 | 3/1960 | Young | 252/186 |
| 4,725,281 | 2/1988 | Stehlin et al. | 8/107 |
| 5,221,711 | 6/1993 | Heuzman et al. | 525/59 |

FOREIGN PATENT DOCUMENTS

| | | |
|---|---|---|
| 0210952 | 2/1987 | European Pat. Off. . |
| 0557730 | 9/1993 | European Pat. Off. . |
| 2650282 | 2/1991 | France . |
| 894993 | 10/1953 | Germany . |
| 9004608 | 5/1990 | WIPO . |

OTHER PUBLICATIONS

Derwent Abstract JP 510 30184, Aug./1976.
Derwent Abstract JP 460 282 26, Aug. 1971.
Derwent Abstract, JP 58029801 Jul. 1984.
Abstracts of Japan, 16, JP 414533 (Sep. 1992).

*Primary Examiner*—C. H. Kelly
*Attorney, Agent, or Firm*—Kevin T. Mansfield

[57] ABSTRACT

There is disclosed an aqueous formulation comprising
(a) a bleach stabilising component,
(b) a salt of an organic carboxylic acid and
(c) a preservative.

The novel formulation is suitable for use as bleaching liquor for cellulosic fibre materials and is distinguished by a superior stabilising action, a very good capacity for binding heavy metal ions, a good inhibition of crystallisation, and the treated fibre materials have very good rewettability. A significant advantage of the novel formulation is its good biodegradability.

4 Claims, No Drawings

BLEACHING AUXILIARY

This application is a continuation-in-part of application Ser. No. 08/255,495, filed Jun. 8, 1994, abandoned.

The present invention relates to an aqueous formulation with bleach stabilising action. Further objects of the invention are a bleaching liquor containing the novel aqueous formulation, a process for bleaching cellulosic fibre materials and the fibre material treated by said process.

The novel aqueous formulation comprises (a) a bleach stabilising component, (b) a water soluble magnesium salt of an organic carboxylic acid, and (c) a preservative.

A suitable bleach stabilising component (a) is a compound selected from ($a_1$) an amino acid polymer having a molecular weight of at least 1000, ($a_2$) an α-monoaminodicarboxylic acid or a derivative thereof, ($a_3$) an anionically modified polysaccharide, and ($a_4$) a sequestrant.

The compound defined as ($a_1$) is preferably a polymer of a monoaminodicarboxylic acid and, most preferably, a polymer of L-aspartic acid or L-glutamic acid.

Compounds of very particular importance are those corresponding to a polypeptide of aspartic acid of formula

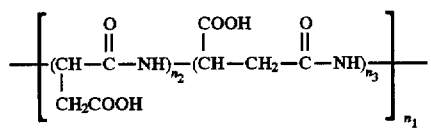

wherein $n_1 = 3–15$, $0 \leq n_2 \leq 2$, $0 \leq n_3 \leq 2$ and the sum of $n_2$ and $n_3$ is 2.

Further important bleaching stabilisers are α-monoaminodicarboxylic acids and derivatives corresponding to component ($a_2$). L-Aspartic acid or L-glutamic acid are of particular interest.

Derivatives of the α-monoaminodicarboxylic acids include in particular carboxymethylated compounds of formula

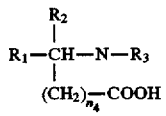

wherein $R_1$ is hydrogen, —$CH_2COOH$ or —$(CH_2)_2COOH$, $R_2$ is hydrogen or —$CH_2COOH$, $R_3$

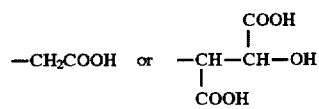

and $n_4$ is 0 or 1.

Carboxymethylated derivatives of aspartic acid or glutamic acid and, preferably, compounds of formula

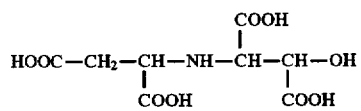

are of very particular interest.

Component ($a_3$) is a high molecular weight compound containing glucose, mannuronic acid, guluronic acid, mannose, galactose, xylose, arabinose, fucose, D-galactose or L-rhamnose as basic structural unit. Homopolysaccharides as well as heteropolysaccharides are suitable, the homopolysaccharides being composed of homogeneous monosaccharide units, whereas the heteropolysaccharides may be composed of different structural units. Illustrative examples of anionic polysaccharides are carboxymethylated guar ether, carboxymethyl starch, carboxymethylated locust bean gum, xanthane, sodium alginate and, most particularly, sodium carboxymethyl cellulose (Na-CMC) and κ-carrageenan. The anionically modified polysaccharides may be used singly or as mixtures with anionic surfactants such as sodium cholate. The mixture ratio of polysaccharide:anionic surfactant is in the range from 10:1 to 1:10, preferably from 5:1 to 1:5 and, most preferably, from 3:1 to 1:3.

Very particularly preferred components ($a_3$) are a mixture of carboxymethyl cellulose sodium salt and sodium cholate in the ratio of 1:1 or a mixture of κ-carrageenan and sodium cholate in the ratio of 3:1.

Also suitable for use in the formulations of this invention are ionic polysaccharides of formula

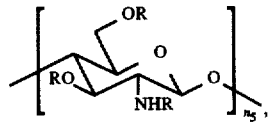

wherein

R is each independently hydrogen or a radical of formula —$COCH_2CH(COOH)_2$ or —$COCH_2N(CH_2COOH)_2$, and $n_5$ is 200 to 13000.

Particularly preferred compounds are those of formula

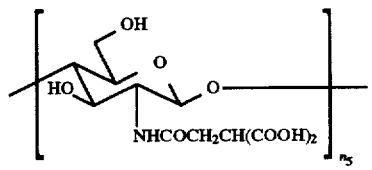

or

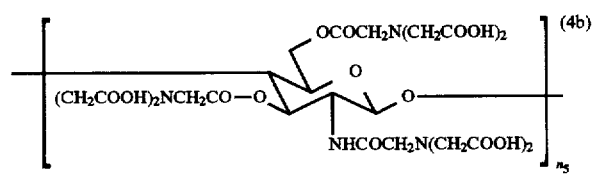

wherein $n_5$ has the given meaning.

Preferred sequestrants as component ($a_4$) of the novel formulation are compounds selected from ($a_{41}$) a mixture of monomers and oligomers of formula $$\begin{array}{c} O \\ \| \\ HO-P-OH \\ | \\ R^4-C-O \\ | \\ HO-P-OH \\ \| \\ O \end{array} \left[ \begin{array}{ccc} & O & \\ & \| & \\ O & HO-P-OH & \\ \| & | & \\ P & C-O \\ | & | & \\ OH & X_1 & \end{array} \right]_{m_1-1} Y_1, \quad (5)$$

wherein $Y_1$ is hydrogen or —$COT_1$, $R_4$, $X_1$ and $T_1$ are each independently of one another $C_1$-$C_4$alkyl and $m_1$ is 1 to 17, ($a_{42}$) aminophosphonic acids, and ($a_{43}$) citric acid.

The mixture of monomers and oligomers ($a_{41}$) is preferably a mixture of monomers and oligomers of formula $$\begin{array}{c} O \\ \| \\ HO-P-OH \\ | \\ R_5-C-O \\ | \\ HO-P-OH \\ \| \\ O \end{array} \left[ \begin{array}{ccc} & O & \\ & \| & \\ O & HO-P-OH & \\ \| & | & \\ P & C-O \\ | & | & \\ OH & R_5 & \end{array} \right]_{m_2-1} H, \quad (6)$$

wherein $R_5$ is methyl or ethyl and $m_2$ is 1 to 14.

A particularly important mixture of monomers and oligomers is that of formula $$\begin{array}{c} O \\ \| \\ HO-P-OH \\ | \\ CH_3-C-O \\ | \\ HO-P-OH \\ \| \\ O \end{array} \left[ \begin{array}{ccc} & O & \\ & \| & \\ O & HO-P-OH & \\ \| & | & \\ P & C-O \\ | & | & \\ OH & CH_3 & \end{array} \right]_{m_3-1} Y_3 \quad (7)$$

wherein $Y_3$ is hydrogen or acetyl and $m_3$ is 1 to 4.

The mixtures of monomers and oligomers of the indicated kind are known per se and are prepared by known methods. Thus, for example, the mixture of formula (7) is prepared preferably by reacting phosphorus trichloride, acetic acid and optionally acetic anhydride in aqueous medium. The oligomeric constituents of component ($a_{41}$) are hydrolysed at least partially to the corresponding monomers in the aqueous novel formulation in the presence of an alkali metal hydroxide. Accordingly, suitable components ($a_{41}$) of the novel formulations are preferably also monomers of one of formulae (5) to (7).

Component ($a_{41}$) is preferably used in the novel formulation as 35 to 90, preferably 40 to 85, most preferably, 40 to 60, percent by weight aqueous solution.

Preferred aminophosphonic acids which correspond to component ($a_{42}$) are aminotrimethylenephosphonic acid, ethylenediaminotetramethylenephosphonic acid or diethylenetriaminopentamethylenephosphonic acid.

A further alternative sequestrant for the mixture of monomeric and oligomeric phosphonates ($a_{41}$) and aminophosphonic acids ($a_{42}$) is citric acid defined as component ($a_{43}$).

It is preferred that the novel formulations contain mixtures of components ($a_{41}$) and/or mixtures of ($a_{42}$) with ($a_{43}$).

Components ($a_1$) to ($a_4$) act as sequestrants for alkaline earth metals and heavy metals in aqueous liquors that contain a per compound, conveniently hydrogen peroxide, for the pretreatment, especially in bleaching processes for cellulosic fibre materials. In particular, these components inhibit the decomposition of the per compound by free, i.e. non-complexed, heavy metals that may be present in the process water or in the alkali which is added.

The magnesium salts of carboxylic acids having complexing properties are salts of gluconic acid, citric acid, malic acid, lactic acid, L-glutamic acid and L-aspartic acid.

As component (b) it is preferred to use the magnesium salts of gluconic acid, most preferably magnesium mono- or digluconate. Magnesium gluconate itself may be used in the novel formulation, preferably as solid. In another embodiment of the invention, the gluconate may, however, also be formed in situ from gluconic acid and magnesium hydroxide or magnesium oxide, preferably magnesium hydroxide. Furthermore, gluconic acid or the sodium salt thereof can be used in conjunction with a water-soluble magnesium salt. A water-soluble magnesium salt may suitably be in this case the acetate, preferably the sulfate or the heptahydrate thereof and, most preferably, the chloride or the hexahydrate thereof. The magnesium salt is usually added as solid, preferably in the form of solid magnesium chloride hexahydrate.

The preservative useful as component (c) typically includes compounds such as chloroacetamide, 1-2-benzothiazolin-3-one, sorbic acid, ascorbic acid, propionic acid, benzoic acid, chlorohexidine gluconate, chlorohexidine acetate, 4-hydroxybenzoate, special butyl esters, also mixtures of methyl and propyl esters, phenoxy etherate, 1,2-benzisothiazolin-3-one or 2-phenyletherate or, preferably, acetic acid.

Particularly preferred novel aqueous formulations comprise ($a_1$) a polypeptide of aspartic acid of formula $$\left[ \begin{array}{c} O \\ \| \\ (CH-C-NH)_{n_2} \\ | \\ CH_2COOH \end{array} \begin{array}{c} COOH \\ | \\ (CH-CH_2 \end{array} \begin{array}{c} O \\ \| \\ -C-NH)_{n_3} \end{array} \right]_{n_1}, \quad (1)$$

wherein $n_1 = 3-15$ $0 \leq n_2 \leq 2$, $0 \leq n_3 \leq 2$ and the sum of $n_2$ and $n_3$ is 2, ($a_{41}$) a mixture of monomers and oligomers of formula $$\begin{array}{c} O \\ \| \\ HO-P-OH \\ | \\ R_5-C-O \\ | \\ HO-P-OH \\ \| \\ O \end{array} \left[ \begin{array}{ccc} & O & \\ & \| & \\ O & HO-P-OH & \\ \| & | & \\ P & C-O \\ | & | & \\ OH & R_5 & \end{array} \right]_{m_2-1} H \quad (6)$$

wherein $R_5$ is methyl or ethyl and $m_2$ is 1 to 14, ($b_1$) a water-soluble magnesium salt of gluconic acid, and ($c_1$) acetic acid.

Further important formulations of this invention comprise ($a_2$) a carboxymethylated α-amino acid of formula

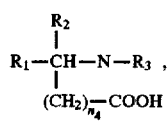 (2)

wherein
$R_1$ is hydrogen, —$CH_2COOH$ or —$(CH_2)_2COOH$,
$R_2$ is hydrogen or —$CH_2COOH$, and

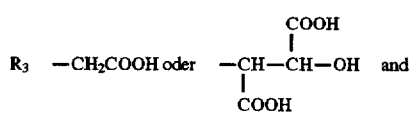

$n_4$ is 0 or 1, (b) a mixture of sodium gluconate and a magnesium salt,
(c) acetic acid, and
(d) a mixture of monomers and oligomers of formula

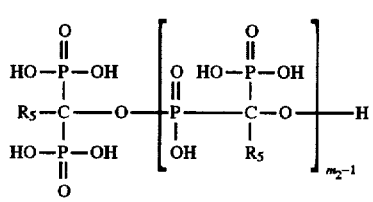 (6)

wherein
$R_5$ is methyl or ethyl and $m_2$ is 1 to 14.

Yet further aqueous formulations suitable for use in the present invention are those that comprise ($a_1$) a polypeptide of aspartic acid of formula

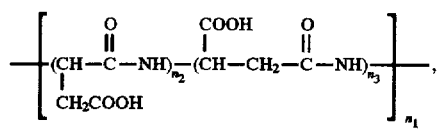 (1)

wherein
$n_1$=3–15,
$0 \leq n_2 \leq 2$,
$0 \leq n_3 \leq 2$ and the sum of $n_2$ and $n_3$ is 2, ($a_{43}$) citric acid, (b) a water-soluble magnesium salt of gluconic acid, and
(c) acetic acid.

The formulations of this invention usually comprise 1 to 40%, preferably 1 to 20%, of component (a), 1 to 25%, preferably 1 to 15% of component (b), 0.1 to 5%, preferably 0.5 to 2%, of component (c), and water to make up 100%, based on the total weight of the formulation.

The novel formulation is conveniently prepared by first adding deionised water to the reactor and then stirring in component (b), component (a) and component (c) in succession, and thereafter homogenising the mixture by stirring.

The compounds of formulae (4a) and (4b) useful as component ($a_3$) are novel compounds that constitute a further object of the present invention. They are prepared, starting from chitosan, in accordance with the reaction scheme:

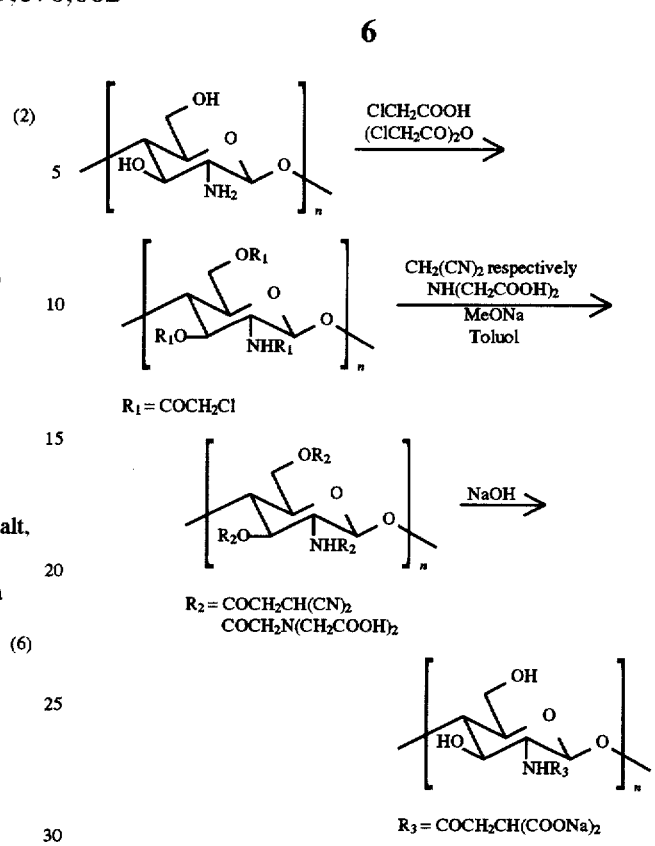

A further object of the invention is the application process for bleaching cellulosic materials. The process comprises treating the fibre material with an aqueous liquor comprising at least the novel aqueous formulation, an alkali metal hydroxide and a per compound.

The aqueous bleaching liquors for carrying out the application process using the novel formulation are a further object of the invention. They contain, as per compound, typically an alkali metal peroxodisulfate or, preferably, an alkali metal peroxosulfate, the preferred per compound being potassium or, most preferably, sodium peroxodisulfate or peroxosulfate. Sodium peroxodisulfate ($Na_2S_2O_8$), which is normally used as solid, is very particularly preferred. The preferred per compound is hydrogen peroxide which, on account of its greater stability, is normally used as concentrated c. 30–60% by weight solution.

Particularly suitable alkali metal hydroxides are potassium hydroxide or, preferably, sodium hydroxide, preferably in the form of a concentrated c. 30% by weight solution, or of solid potassium hydroxide or, preferably, sodium hydroxide.

In addition to comprising the novel formulation, alkali metal hydroxide and a per compound as optional components, the bleaching liquors may also comprise optional components selected from wetting agents or surfactants, antifoams or deaerators and/or fluorescent whitening agents.

A wetting agents or surfactants are usually added as optional components to the bleaching liquor if the cellulose component of the cellulosic fibre material to be treated is in the raw state or, in particular, consists of raw cotton. Suitable wetting agents or surfactants are anionic or nonionic surfactants, especially mixtures thereof. Typical examples of preferred anionic surfactants are alkylarylmonosulfonates, fatty acid condensates, proteolysis products or salts thereof and, most preferably, alkylmonosulfonates and alkylbenzenemonosulfonic acids containing 12 to 22 carbon atoms in the alkyl moiety. Illustrative examples of nonionic surfactants are adducts of alkylene oxides, preferably propylene oxide and, most preferably, ethylene oxide and alkylphenols containing 4 to 12 carbon atoms in the alkyl moiety, preferably fatty acid amides and, more particularly, end-capped fatty alcohols, adducts of ethylene oxide and fatty alcohols being especially preferred, mixtures of which adducts with the alkylmonosulfonates of the indicated kind being in turn very particularly preferred. Further suitable components in these mixtures are also silicone surfactants.

The addition of antifoams and deaerators as optional components to the bleaching liquors is indicated especially if the liquor contains a wetting agent and/or surfactant. They are typically higher alcohols, especially isooctanol, but are preferably silicone-based antifoams and/or deaerators, most preferably silicone oil emulsions.

The fluorescent whitening agents also added to the bleaching liquors as optional component in order to impart to the treated material a particularly high degree of whiteness usually belong to the styryl and stilbene classes, and are typically distyrylarylenes, diaminostilbenes, ditriazolyl stilbenes, phenylbenzoxyzolyl stilbenes, stilbene naphthotriazoles and dibenzoxazolyl stilbenes. Preferred fluorescent whitening agents are those of the distyryl biphenyl or bis(triazinyl)aminostilbene type which contain sulfonic acid groups, e.g. sulfonated bis(styryl)biphenyl and bis(triazinyl) derivatives, preferably the bis(phenylaminomorpholino-s-triazinyl)stilbenedisulfonic acids obtained in the form of alkali metal salts, in particular potassium or, preferably, sodium salts. These fluorescent whiteners are preferably used as commercially available aqueous c. 20–30 percent by weight liquid formulations.

The application process for bleaching cellulosic fibre materials using the novel formulation is carried out by per se known methods. A distinction is made here between a treatment in long liquors, a cold bad-batch bleaching process and an immersion bleaching process.

In long liquors the material is subjected to a treatment at a liquor to goods ratio of about 1:3, e.g. in a jigger, to about 1:40, e.g. on a winchbeck, for about 1 to 3 hours at elevated temperature. The treatment temperature is in the range from about 40° to 140° C., preferably from 60° to 100° C., under normal conditions, i.e. under atmospheric pressure or above 100° C., preferably in the range from 105° to 140° C., under so-called HT conditions (HT=high-temperature).

The immersion bleaching treatment is carried out under the same application conditions, except that the concentration of per compound is higher.

In the cold pad-batch bleaching process, the material to be treated is impregnated by immersion in a padding liquor and then pinched-off, the padding liquor usually having a temperature of 20° to 95° C. Impregnation is preferably carried out at room temperature. The chemicals applied by impregnation then act on the textile material, the treatment time, the temperate and the concentration of the chemicals being in direct relation to one another, and the chosen conditions depending on the nature of fibre material and, in particular, on the apparatus used. Thereafter the impregnated and preferably rolled-up goods are stored at room temperature (15°–30° C.) for 3 to 24 hours, the hatching time depending on the type of bleaching bath. The fibre materials are subsequently thoroughly rinsed first with hot water of 90°–98° C., then with warm and, finally, with cold water, if required neutralised with e.g. acetic acid and then hydroextracted and dried preferably at elevated temperature of up to e.g. 150° C.

Depending on whether they are long liquors, immersion liquors or cold pad-batch bleaching liquors, the aqueous bleaching liquors are formulated as indicated.

The long-bleaching liquors comprise
0.5 to 5 g/kg, preferably 0.5 to 2 g/kg, of the novel aqueous formulation,
1 to 6 ml/kg, preferably 2 to 5 ml/kg, of a per compound,
1 to 5 g/kg, preferably 0. 1 to 2 g/kg, of an alkali metal hydroxide,
0 to 2 g/kg, preferably 0.5 to 1 g/kg, of a wetting agent or surfactant,
0 to 0.5 g/kg or 0.05 to 0.5 g/kg of an antifoam or deaerator, and
0 to 5 g/kg, preferably 1.5 to 4 g/kg, of a fluorescent whitening agent.

The immersion bleaching comprise
0.5 to 5 g/kg, preferably 0.5 to 2 g/kg, of the novel aqueous formulation,
2 to 12 ml/kg, preferably 4 to 10 ml/kg, of a per compound,
1 to 5 g/kg, 1.5 to 4 g/kg, of an alkali metal hydroxide,
0 to 2 g/kg, preferably 0.5 to 1 g/kg, of a wetting agent or surfactant,
0 to 0.5 g/kg or 0.05 to 0.5 g/kg of an antifoam or deaerator, and
0 to 30 g/kg, preferably 2 to 10 g/kg, of a fluorescent whitening agent.

The cold pad-batch bleaching liquors comprise
5 to 15 g/kg, preferably 8 to 12 g/kg, of the novel aqueous formulation,
60 to 60 ml/kg, preferably 50 to 60 ml/kg, of a per compound,
20 to 50 g/kg, preferably 25 to 40 g/kg, of an alkali metal hydroxide,
1 to 6 g/kg, preferably 3 to 6 g/kg, of a wetting agent or surfactant,
0 to 2 g/kg, preferably 0.05 to 1 g/kg, of an antifoam or deaerator, and
0 to 6 g/kg, preferably 2 to 6 g/kg, of a fluorescent whitening agent.

The cellulosic fibre material to be treated may be in any form of presentation, typically as loose material, yarn, woven or knitted goods. It will normally always consist of textile fabrics that are made from pure textile cellulose fibres or from blends of textile cellulose fibres with synthetic textile fibres.

Cellulosic fibres are typically those from regenerated cellulose such as viscose rayon or viscose, those from natural cellulose such as hemp, linen, jute and ramie and, in particular, cotton. Synthetic fibres are suitably those made from polyacrylonitrile and, in particular, from polyester and polyamide.

Cotton or regenerated cellulose fabrics or blends of cotton and polyester and of cotton and polyamide are particularly suitable for treatment in the practice of this invention. Cotton woven and knitted goods are preferred. Materials that have been prewashed with surfactants are also suitable. It is also possible to bleach sized cotton fabrics, in which case bleaching is carried out before or, preferably, after sizing.

The fibre materials treated with the novel formulation are distinguished by their freedom from husks, their low ash content and, in particular, by their superior whiteness degree. The cellulose or cellulosic moiety of the bleached material exhibits no damage or no substantial reduction in the degree of cellulose polymerisation (=DP=average degree of polymerisation). The formulation of this invention effects a particularly high stabilisation, especially in bleaching liquors that have a pH>11. Traces of heavy metals, especially iron(III) ions, which can cause spontaneous decomposition of the per compounds present in the bleaching liquor, are effectively neutralised. One consequence thereof is that the original content of active oxygen of the bleaching liquors is retained over a considerable period of time (e.g. up to 5 days) or decreases only insignificantly, by at most 10%. An excellent bleaching effect is nevertheless achieved. The liquors are thus stable in regard to their content of active oxygen and can be used for some time. Moreover, the novel formulation inhibits crystallinity with respect to water hardness. A fabric treated with the novel formulation has excellent rewettability. A significant advantage of the novel formulation is its good biodegradibility.

In the following Examples pans and percentages are by weight.

Preparation of the novel compounds:

EXAMPLE 1 a) Preparation of the compound of formula (101a)

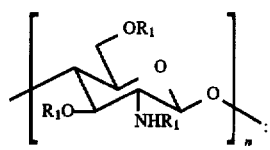

$R_1 = COCH_2Cl$ 13.5 kg of chloroacetic acid are charged to a 50 liter enamel kettle and fused at 80° C. Then 1.25 kg (7.754 mol) of chitosan are added in increments. To the resultant beige slurry are added 4.8 kg (28.07 mol) of chloroacetic anhydride. The batch turns darker in colour and the viscosity decreases. The reaction temperature is kept constant overnight and next morning a dark-brown solution has formed. A sample is taken and an equal volume of water is added. The brown precipitate is filtered with suction and dried. The IR analysis is consistent with the reference substance.

20 liters of water are charged to a second kettle and the reaction solution is pumped from the first kettle. The resultant brown suspension is cooled to 20° C., pumped to a suction filter and filtered. The light brown precipitate is washed with c. 60 liters of water until neutral and vacuum dried at 60°–70° C.

Yield: 2.58 kg (=85.3% of theory) of the compound of formula (101a).

b. Preparation of the compound of formula (101b)

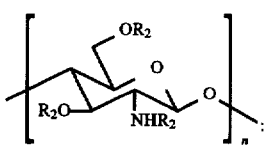

$R_2 = COCH_2CH(CN)_2$ 20 liters of toluene are charged to a 50 liter enamel kettle and 1.7 kg (4.34 mol) of the compound of formula (101a) are added. The kettle is flushed with nitrogen and the contents are cooled to 10° C. Then 5 liters of toluene are placed in a 10 liter plane ground glass flask and 861 g (13.03 mol) of malodinitrile are dissolved therein. The flask is then flushed with nitrogen. The brown solution is cooled with an ice-bath to 10° C. and 2.347 kg (13.03 mol) of a 30% solution of sodium methylate is added in increments such that a temperature of 15° C. is not exceeded. The beige suspension so obtained is stirred for 30 minutes.

On the next day a sample of the suspension is taken, filtered with suction and the precipitate is dried and analysed by IR spectroscopy. The spectrum is consistent with the reference substance.

The batch is pumped to an earthed suction filter and washed with 10 liters of toluene. The brown precipitate is vacuum dried at 60° C.

Yield: 2.9 kg of the compound of formula (101b)(= 139.4% of theory).

(N.B.: The yield is too high, as the product still contains KCl. The exact yield can be ascertained by determining the chlorine content by elemental analysis).

c. Preparation of the compound of formula (101c)

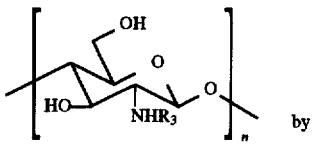

$R_3 = COCH_2CH(COONa)_2$ hydrolyis

A 50 liter enamel kettle is charged with a solution of 15 liters of water and 1.042 kg of NaOH pastilles and 2.9 kg of the compound of formula (101b) are added. The brown suspension is refluxed for 5 hours to 105° C. The ammonium that forms is expelled with nitrogen. The IR spectrum still shows a distinct CN band, so that a further 348 g of NaOH are added and the batch is heated for another 3 hours. The batch is refluxed until no more CN band is present (altogether 12 hours). The brown solution is then neutralised and subjected to reverse osmosis to effect complete desalting and concentration. The concentrate is lyophilised.

Yield: 746.2 g (=49.2% of theory) of the compound of formula 101c).

Preparation of the novel formulations

EXAMPLE 2

With stirring, 60 g of magnesium gluconate are added to 770 g of deionised water.

The following ingredients are then added in succession:

15 g of the compound of formula

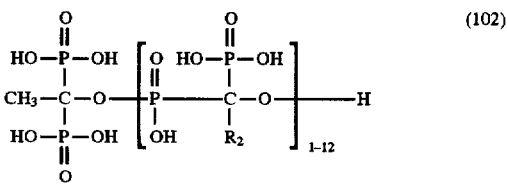

(102)

150 g of a 40% aqueous solution of the compound of formula

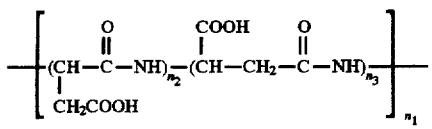

(molecular weight 3000)

$0 \leq n_2 \leq 2$, $0 \leq n_3 \leq 2$ and the sum of $n_2$ and $n_3$ is 2, $n_1$ is 3 to 15 and 5 g of acetic acid and the batch is homogenised by stirring.

A clear formulation is obtained.

EXAMPLE 3

The procedure described in Example 2 is repeated, but replacing 15 g of the compound of formula (102) with 20 g of citric acid.1 aq and bulking with 100 g of water.

A clear formulation is obtained.

EXAMPLE 4

In this Example the magnesium digluconate used in Examples 2 and 3 is prepared in situ from gluconic acid and magnesium hydroxide.

11.3 g of 50% gluconic acid are dissolved in 70.85 g of water and then 0.84 g of magnesium hydroxide are stirred in.

When the pH has stabilised to c. 6.5, 1.5 g of the compound of formula (102), 15 g of a 40% aqueous solution of the compound of formula (103), and 0.5 g of acetic acid are added. As in Example 1, the magnesium is here theoretically in the form of the digluconate salt.

A clear formulation is obtained.

EXAMPLE 5

76.51 g of water are dissolved in 5.65 g of 50% gluconic acid and then 0.84 g of magnesium hydroxide is stirred in.

When the pH has stabilised, 1.5 g of the compound of formula (102), 15 g of a 40% aqueous solution of the compound of formula (103), and 0.5 g of acetic acid are added.

In contrast to Examples 2 and 3, the magnesium is here in the form of the monogluconate salt.

A clear formulation is obtained.

EXAMPLE 6

0.84 g of magnesium hydroxide and 12.4 g 50% gluconic acid are reacted and the reaction mixture is diluted with 39.41 g of water.

Then 30.0 g of citric acid.1 aq 7.2 g of NaOH, 10.0 g of the compound of formula (102) and 0.15 g of a preservative based on 1,2-benzisothiazolin-3-one are stirred in in succession.

A clear brownish solution is obtained.

EXAMPLE 7

0.84 g of magnesium hydroxide are reacted with 12.4 g of 50% gluconic acid and 8.0 g of an oligomeric molymaleic acid until a clear solution forms. The solution is then diluted with 68.61 g of deionised water.

Then 10.0 g of the compound of formula (102) and 0.15 g of a preservative based on 1,2-benzisothiazolin-3-one are stirred in.

A clear brownish solution is obtained.

EXAMPLE 8

12.4 g of 50% gluconic acid are reacted with 0.84 g of magnesium hydroxide for 4 hours at 60° C.

Then 10.0 g of a sugar-based polymer, e.g. ®Solopol ZB 76.61 g of deionised water and 0.5 g of a preservative based on 1,2-benzisothiazolin-3-one are added in succession.

A clear brownish solution is obtained.

EXAMPLE 9

17 g of 50% gluconic acid are reacted with 9 g of $MgCl_2.6H_2O$ until a clear solution forms. The solution is then diluted with 31.25 g of deionised water.

Then 10.0 g of the compound of formula (102), 20 g of citric acid.1 aq, 12.6 g of NaOH (30%) and 0.15 g of a preservative based on 1,2-benzisothiazolin-3-one are added in succession.

A clear brownish solution is obtained.

EXAMPLE 10

With stirring, 6 g of magnesium gluconate are added to 83.85 g of deionised water.

Then 10 g of the compound of formula (103) and 0.15 g of a preservative based on 1,2-benzisothiazolin-3-one are added and the batch is homogenised by stirring.

A clear formulation is obtained.

Application Examples

EXAMPLE 11

Unbleached cotton tricot is treated for 45 minutes at 98° C. in a bleaching bath that contains, per liter, 0.5 g of the formulation of Example 2, 1 g of a low-foam wetting agent, e.g. ®Ultravon EL 1 g of NaOH (100%) and 4 ml of $H_2O_2$.

The liquor to goods ratio is 1:20.

The whiteness degree of the cotton tricot is increased by the bleach from −68 to 36 Ciba whiteness units. The percentage decrease of peroxide during the bleach is only 5% of the original concentration.

The whiteness is increased to 33 Ciba whiteness units by replacing the formulation of Example 2 with 0.5 g/l of a formulation prepared in Example 3. The peroxide concentration decreases during the bleach by 20%.

EXAMPLE 12

Unbleached cotton tricot is treated for 45 minutes at 98° C. in three bleaching baths ($B_1$, $B_2$, $B_3$) which contain, per liter:

$B_1$:0.5 g of the formulation prepared in Example 6

$B_2$:0.5 g of the formulation prepared in Example 7

$B_3$:0.5 g of the formulation prepared in Example 8

The bleaching baths $B_1$, $B_2$ and $B_3$ each additionally contain 1 g of a low-foam wetting agent, e.g. ®Ultravon EL, 2.5 g of NaOH (100%) and 4 ml of $H_2O_2$ (35%).

The liquor to goods ratio is 1:10.

The whiteness values are reported in the following table (Table 1):

TABLE 1

| Bleaching baths | $B_1$ | $B_2$ | $B_3$ |
|---|---|---|---|
| Whiteness (R 46 without filter) | 82.8 | 82.7 | 82.5 |
| DP (raw = 2600) | 2690 | 2360 | 2500 |

DP = degree of polymerisation (average)

The results show that all bleaching baths result in superior whiteness without damage to the fibres.

EXAMPLE 13

Raw cotton grades are bleached by scorching, desizing, boiling and mercerising processes in a cold pad-batch bleaching bath with the following formulation:

0.15 g of magnesium sulfate, 3 g/l of the formulation prepared in Example 9, 10 g/l of NaOH 100%, 7 ml/l of water glass 30° Bé, 40 ml/l of $H_2O_2$ 35% and 1 g/l of a low-foam wetting agent, e.g. ®Ultravon EL.

After impragnation (pick-up c. 100%) and a batching time of 24 hours, very good effects are obtained with respect to whiteness, hydrophilic properties and husk removal.

What is claimed is:

1. An aqueous formulation comprising ($a_1$) a polypeptide of aspartic acid of the formula

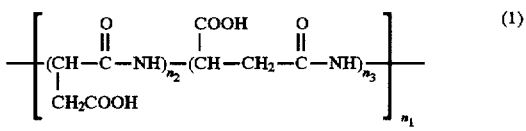 (1)

wherein $n_1$=3–15, $0 \leq n_2 \leq 2$, $0 \leq n_3 \leq 2$ and the sum of $n_2$ and $n_3$ is 2, (b) a magnesium salt of an organic carboxylic acid, and (c) a preservative.

2. A formulation according to claim 1, which comprises, based on the active substance, 1 to 40% of component ($a_1$), 1 to 25% of component (b), 0.1 to 5% of component (c), and water to make up 100%.

3. A process for bleaching cellulosic fibre material which comprises treating said material with an aqueous liquor that contains at least one per compound, an alkali metal hydroxide and a formulation as claimed in claim 1.

4. A bleaching liquor comprising at least one per compound, an alkali metal hydroxide and a formulation as claimed in claim 1.

* * * * *